(12) United States Patent
Ito et al.

(10) Patent No.: US 11,984,552 B2
(45) Date of Patent: May 14, 2024

(54) PHASE-TRANSITION SOLID ELECTROLYTE MATERIAL AND ALL SOLID SECONDARY BATTERY INCLUDING THE SAME

(71) Applicant: Samsung Electronics Co., Ltd., Suwon-si (KR)

(72) Inventors: Seitaro Ito, Kanagawa (JP); Tomoyuki Tsujimura, Kanagawa (JP); Yuichi Aihara, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 417 days.

(21) Appl. No.: 16/683,457

(22) Filed: Nov. 14, 2019

(65) Prior Publication Data

US 2020/0161699 A1 May 21, 2020

(30) Foreign Application Priority Data

Nov. 16, 2018 (JP) .................................. 2018-215189
Apr. 30, 2019 (KR) ......................... 10-2019-0050996

(51) Int. Cl.
*H01M 10/0562* (2010.01)
*C01G 53/00* (2006.01)
(Continued)

(52) U.S. Cl.
CPC ........ *H01M 10/0562* (2013.01); *C01G 53/42* (2013.01); *C01G 53/50* (2013.01);
(Continued)

(58) Field of Classification Search
None
See application file for complete search history.

(56) References Cited

U.S. PATENT DOCUMENTS 9,640,837 B2    5/2017  Doi
2015/0214574 A1* 7/2015  Tanaka ..................... H01B 1/10
                                                   429/323

(Continued)

FOREIGN PATENT DOCUMENTS

JP    2001250580 A    9/2001
JP    2004206942 A    7/2004
(Continued)

OTHER PUBLICATIONS

Japanese Office Action for Japanese Patent Application No. 2018-215189 dated Dec. 1, 2022.
(Continued)

*Primary Examiner* — Lucas J. O'Donnell
(74) *Attorney, Agent, or Firm* — CANTOR COLBURN LLP

(57) ABSTRACT

An all-solid secondary battery includes: a cathode layer including a cathode active material; an anode layer; and a solid electrolyte layer disposed between the cathode layer and the anode layer, wherein at least one of the cathode layer, the anode layer, or the solid electrolyte layer includes a phase-transition solid electrolyte material, wherein upon heating, the phase-transition solid electrolyte material undergoes a phase transition from a first phase to a second phase, and the second phase has an ionic conductivity less than the ionic conductivity of the first phase.

2 Claims, 6 Drawing Sheets

(51) Int. Cl.
*H01M 4/38* (2006.01)
*H01M 4/505* (2010.01)
*H01M 4/525* (2010.01)
*H01M 10/0585* (2010.01)

(52) U.S. Cl.
CPC ........... *H01M 4/382* (2013.01); *H01M 4/505* (2013.01); *H01M 4/525* (2013.01); *H01M 10/0585* (2013.01); *C01P 2002/72* (2013.01); *C01P 2006/40* (2013.01); *H01M 2300/0068* (2013.01)

(56) References Cited

U.S. PATENT DOCUMENTS

| | | | | |
|---|---|---|---|---|
| 2016/0149259 | A1* | 5/2016 | Osada | C03C 4/18 429/323 |
| 2016/0380305 | A1* | 12/2016 | Doi | H01M 10/0562 429/322 |
| 2018/0233775 | A1* | 8/2018 | Suzuki | H01M 10/052 |
| 2019/0260066 | A1* | 8/2019 | Hu | H01M 4/134 |
| 2020/0091552 | A1* | 3/2020 | Terai | H01M 4/13 |
| 2020/0328465 | A1* | 10/2020 | Sakaida | C01G 49/009 |
| 2021/0218056 | A1* | 7/2021 | Fukushima | H01B 1/10 |
| 2021/0323824 | A1* | 10/2021 | Nazar | H01M 10/0562 |
| 2023/0123228 | A1 | 4/2023 | Holme et al. | |

FOREIGN PATENT DOCUMENTS

| | | |
|---|---|---|
| JP | 2009016213 A | 1/2009 |
| JP | 4601114 B2 | 12/2010 |
| JP | 201438755 A | 2/2014 |
| JP | 2015011901 A | 1/2015 |
| JP | 2015225776 A | 12/2015 |
| JP | 2016081883 A | 5/2016 |
| JP | 201714037 A | 1/2017 |
| JP | 2017014037 A | 1/2017 |
| JP | 2017045594 A | 3/2017 |
| JP | 2017067482 A | 4/2017 |
| KR | 20180090293 A | 8/2018 |

OTHER PUBLICATIONS

Korean Office Action for Korean Patent Application No. 10-2019-0050996 dated Mar. 14, 2024.

* cited by examiner

PHASE-TRANSITION SOLID ELECTROLYTE MATERIAL AND ALL SOLID SECONDARY BATTERY INCLUDING THE SAME

CROSS-REFERENCE TO RELATED APPLICATION

This application claims priority to and the benefit of Japanese Patent Application No. 2018-215189, filed on Nov. 16, 2018, in the Japanese Patent Office, and Korean Patent Application No. 10-2019-0050996, filed on Apr. 30, 2019, in the Korean Intellectual Property Office, the contents of both of which are incorporated herein by reference in their entirety.

BACKGROUND

1. Field

The present disclosure relates to a solid electrolyte material and an all-solid secondary battery including the solid electrolyte material.

2. Description of the Related Art

In a lithium-ion rechargeable battery including a non-aqueous electrolyte solution, when a short circuit occurs, there are instances of heat generation due to the Joule heat generated from a short circuit current. The heat generation may cause ignition of the non-aqueous electrolyte solution, which is an organic substance, or oxidative combustion of an electrode active material. To prevent thermal runaway in a non-aqueous electrolyte lithium-ion rechargeable battery caused by such heat generation, a separator of the lithium-ion rechargeable battery may be designed to lose its porosity when it reaches a predetermined temperature or higher. This may shut down the charge reaction in the battery and thus prevent thermal runaway. In particular, it is desirable to provide a non-aqueous electrolyte lithium-ion rechargeable battery having a higher energy density, as compared with other secondary batteries, and a suitable safety mechanism.

An all-solid secondary battery including a solid electrolyte has been developed. Since an all-solid secondary battery does not include an organic electrolyte solution, the all-solid secondary battery is safer than a non-aqueous electrolyte lithium-ion rechargeable battery. An all-solid secondary battery has a high energy density and may be manufactured to be lighter and smaller and to have longer lifespan depending on the structure thereof.

SUMMARY

Disclosed is a solid electrolyte material and an all-solid secondary battery including the solid electrolyte material, in which the all-solid secondary battery may have a shutdown function.

Additional aspects will be set forth in part in the description which follows and, in part, will be apparent from the description, or may be learned by practice of the presented embodiments.

According to an aspect of the present disclosure, provided is a phase-transition solid electrolyte material including at least one sulfide represented by Formula (4) or Formula (5):

$$d(e\text{LiBr-}(1\text{-}e)\text{LiCl})\text{-}(1\text{-}d)\text{Li}_3\text{PS}_4 \quad (4)$$

$$d(e\text{LiBr-}(1\text{-}e)\text{LiCl})\text{-}2(1\text{-}d)(0.75\text{Li}_2\text{S-}0.25\text{P}_2\text{S}_5) \quad (5)$$

wherein, in Formula (4) and Formula (5), d and e are each independently
0.1≤d≤0.7, and
0≤e≤1.

According to an aspect of the present disclosure, there is provided is an all-solid secondary battery including:
a cathode layer comprising a cathode active material;
an anode layer; and
a solid electrolyte layer between the cathode layer and the anode layer,
wherein at least one of the cathode layer, the anode layer, or the solid electrolyte layer includes a phase-transition solid electrolyte material, wherein upon heating, the phase-transition solid electrolyte material undergoes a phase transition from a first phase to a second phase, and the second phase has an ionic conductivity that is less than an ionic conductivity of the first phase.

In an embodiment, the all-solid secondary battery may be provided with a shutdown function without installation of an additional device.

The phase-transition of the phase-transition solid electrolyte material may occur at a temperature equal to or less than a decomposition temperature of the cathode active material.

In the all-solid secondary battery according to an embodiment, heat generation from a decomposition reaction of the cathode active material may be prevented.

The phase-transition of the phase-transition solid electrolyte material may occur in a temperature range of about 200° C. or greater to about 300° C. or less.

In the all-solid secondary battery according to an embodiment, due to the suppressed decomposition reaction of each component of the all-solid secondary battery, including the cathode active material, heat generation may be suppressed at a relatively early stage, and damage to other devices which may be in close proximity to (near or adjacent to) the all-solid secondary battery may be prevented.

The phase-transition solid electrolyte material may include $\text{Li}_2\text{S}$ and $\text{P}_2\text{S}_5$.

Due to the inclusion of the phase-transition solid electrolyte material in the solid electrolyte layer, a shutdown function may be provided without installation of an additional device.

The phase-transition solid electrolyte material may include at least one sulfide material represented by Formula (6):

$$a\text{Li}_2\text{S-}(1\text{-}a)\text{P}_2\text{S}_6 \quad (6)$$

In Formula (6),
0.7<a<0.9.

Due to this, a shutdown function may be provided without installation of an additional device.

In Formula (6): 0.72≤a≤0.8.

The phase-transition solid electrolyte material may include at least one sulfide material represented by Formula (1):

$$b\text{LiX-}(1\text{-}b)(c\text{Li}_2\text{S-}(1\text{-}c)\text{P}_2\text{S}_5) \quad (1)$$

wherein, in Formula (1),
0.01≤b≤0.7,
0.6≤c≤0.9, and
X is at least one of Cl, Br, or I.

Due to this, a shutdown function may be provided without installation of an additional device.

In Formula (1), b and c may satisfy the following equations: 0.2≤b≤0.67 and 0.7≤c≤0.8.

The phase-transition solid electrolyte material may include at least one sulfide material represented by Formula (2) or Formula (3):

$$d(e\text{LiBr-}(1-e)\text{LiCl})\text{-}(1-d)\text{Li}_3\text{PS}_4 \quad (2)$$

$$d(e\text{LiBr-}(1-e)\text{LiCl})\text{-}2(1-d)(0.75\text{Li}_2\text{S-}0.25\text{P}_2\text{S}_5) \quad (3)$$

wherein, in Formula (2) and Formula (3), d and e are each independently
0.1≤d≤0.7, and
0≤e≤1.

Due to this, a shutdown function may be provided without installation of an additional device.

The cathode active material may include a layered oxide material including Li and at least one of Ni, Co, Mn, and Al; and at least one of elemental sulfur or a sulfur compound.

When the cathode active material includes these materials, a comparatively high charge voltage may be obtained, and the all-solid secondary battery may have improved energy density and thermal stability.

The cathode active material may include a compound represented by $\text{LiNi}_x\text{Co}_y\text{Al}_z\text{O}_2$ or $\text{LiNi}_{x'}\text{Co}_{y'}\text{Mn}_{z'}\text{O}_2$, wherein 0<x<1, 0<y<1, 0<z<1, x+y+z=1, 0<x'<1, 0<y'<1, 0<z'<1, and x'+y'+z'=1.

The anode layer may include an anode active material, and the anode active material may include a material which forms an alloy or a compound with lithium.

The anode active material may be a lithium metal. The lithium metal may serve as an ion conductor and electron conductor. Accordingly, an anode current collector for electron conduction and an additional anode active material for ion conduction may be omitted.

A charge capacity of the cathode layer may satisfy the relationship represented by Formula (I):

$$0.002 < b/a < 0.5 \quad (I)$$

wherein, in Formula (I), a is a charge capacity of the cathode layer, and b is a charge capacity of the anode layer.

The solid electrolyte layer may include a first solid electrolyte layer and a second solid electrolyte layer, the first solid electrolyte layer may include the phase-transition solid electrolyte material, and the second solid electrolyte layer may include a solid electrolyte material which is different from the phase-transition solid electrolyte material.

The solid electrolyte material which is different from the phase-transition solid electrolyte material may include a sulfide solid electrolyte material.

The first solid electrolyte layer may be in contact with the cathode layer.

The first solid electrolyte layer may be in contact with the anode layer.

The first solid electrolyte layer and the second solid electrolyte layer are in contact with each other.

Due to such arrangement of the layers, a shutdown function and further improvement of ionic conductivity are provided.

In the above-described Formulae (1) to (6), a, b, c, d, and e are stoichiometric coefficients. Accordingly, a final product may be a compound represented by the formula, which is obtained by multiplying each stoichiometric coefficient by x times (wherein x is a positive natural number).

For example, Formulae (1) to (6) may be represented by Formulae (7) to (12), respectively.

$$x b\text{LiX-}x(1-b)(c\text{Li}_2\text{S-}(1-c)\text{P}_2\text{S}_5) \quad (7)$$

In Formula (7),
0.01≤b≤0.7,
0.6≤c≤0.9
x may be a positive natural number, and
X may be at least one of Cl, Br, or I.

$$x d(e\text{LiBr-}(1-e)\text{LiCl})\text{-}x(1-d)\text{Li}_3\text{PS}_4 \quad (8)$$

$$x d(e\text{LiBr-}(1-e)\text{LiCl})\text{-}2x(1-d)(0.75\text{Li}_x\text{S-}0.25\text{P}_2\text{S}_5) \quad (9)$$

In Formula (8) and Formula (9), d and e are each independently
0.1≤d≤0.7,
0≤e≤1, and
x may be a positive natural number.

$$d(e\text{LiBr-}(1-e)\text{LiCl})\text{-}(1-d)\text{Li}_3\text{PS}_4 \quad (10)$$

$$d(e\text{LiBr-}(1-e)\text{LiCl})\text{-}2x(1-d)(0.75\text{Li}_x\text{S-}0.25\text{P}_2\text{S}_5) \quad (11)$$

In Formula (10) and Formula (11), d and e are each independently
0.1≤d≤0.7,
0≤e≤1, and
x may be a positive natural number, $$a\text{Li}_2\text{S-}(1-a)\text{P}_2\text{S}_6 \quad (12)$$

In Formula (12),
0.7<a<0.9, and
x may be a positive natural number.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
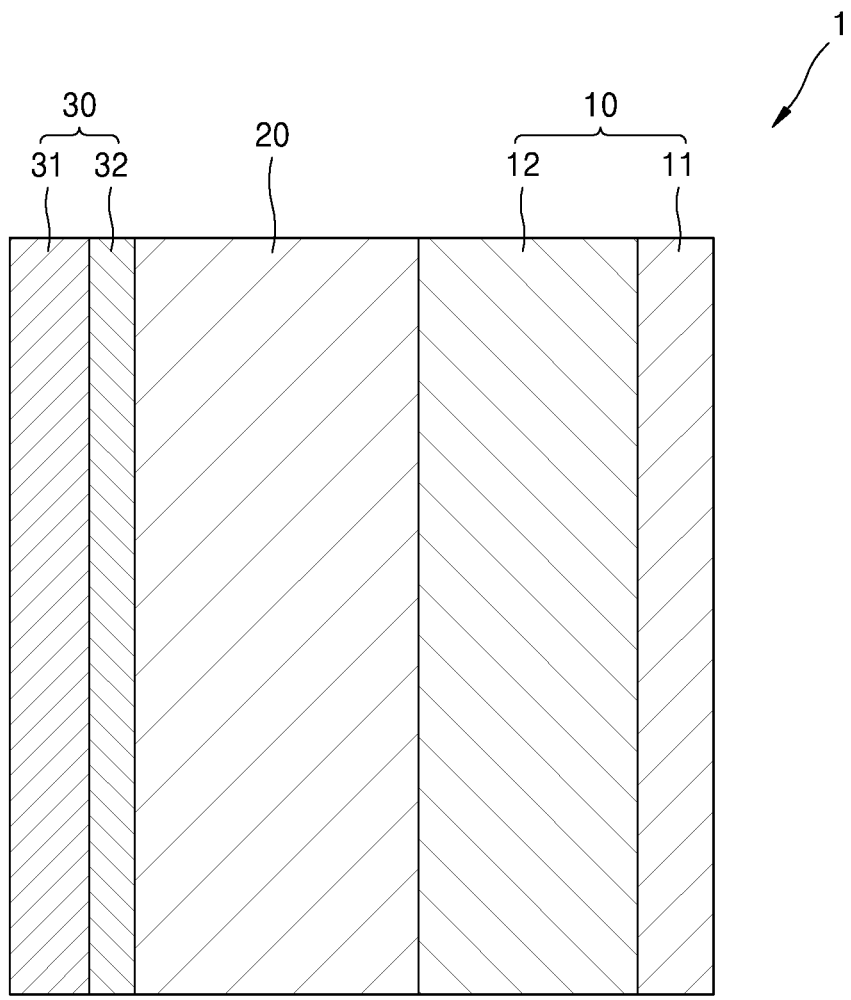
FIG. 1 is a schematic cross-sectional view illustrating a structure of an all-solid secondary battery, according to a first embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Reference will now be made in detail to embodiments, examples of which are illustrated in the accompanying drawings. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Embodiments will be described in detail with reference to the appended drawings. In the following description and drawings, constituent elements having substantially the same functional constitutions are assigned like reference numerals, and overlapping descriptions will be omitted.

The terminology used herein is for the purpose of describing particular embodiments only and is not intended to be limiting of the present disclosure. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. "or" means "and/or." As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Throughout the specification, the term "phase-transition solid electrolyte material" means a solid electrolyte material which may phase-transit from a first phase to a second phase, wherein the first phase is different from the second phase.

When an oxide material is used as an electrode active material in an all-solid secondary battery, it is likely that the all-solid secondary battery will reach a high temperature due to oxidative combustion of the electrode active material. Thus, a shut-down device for shutting down the charge reaction when overheating occurs is an important feature for the all-solid secondary battery. However, in an all-solid secondary battery, the solid electrolyte layer may serve as a separator. Since the solid electrolyte layer does not melt at a high temperature, it is hard to provide a shutdown function to the solid electrolyte layer.

To provide a shutdown function to an all-solid secondary battery, there have been several suggestions. For example, KR 10-2017-45594 discloses a solid battery in which an aluminum layer is disposed as an electric current layer and a calcium oxide layer is disposed on a surface of a tap portion. KR 10-2009-16213 discloses a lithium battery in which a barrier layer for physically blocking growth of lithium crystals is disposed at a site of blocking growth routes of lithium crystals on a surface of a solid electrolyte layer. KR 10-2016-81883 discloses an all-solid battery in which a thermally distortable metal member is disposed between a solid electrolyte layer and a cathode active material layer, or between the solid electrolyte layer and an anode active material layer.

However, all the batteries disclosed in the patent documents 1 to 3 are provided with an additional external device. In this case, the structures of the batteries may become complicated and it may also be difficult to make the batteries smaller.

To provide a shutdown function without addition of an additional structure, the present inventors have conducted numerous studies investigating the composition of each layer of an all-solid secondary battery. During the investigation, the present inventors focused on a solid electrolyte material greatly affecting the conduction of ions in the all-solid secondary battery.

Recently, it has been reported that the ionic conductivity of a sulfide-based (sulfide-containing) solid electrolyte is remarkably improved to about $10^{-2}$ Siemens per centimeter (S/cm) at room temperature, which is equivalent to or greater than the ionic conductivity of a liquid electrolyte.

Such a solid electrolyte material may be obtained by synthesizing a precursor, and then heat treating the precursor at a high temperature of about 300° C. or greater. Solid electrolyte materials do not deteriorate at high temperatures, unlike liquid electrolytes, and have improved ionic conductivity as the temperature rises, and thus battery characteristics may be improved. When a short circuit occurs and the internal temperature of a battery is increased to a temperature of about 250° C., at which thermal runaway of the electrode material occurs, the solid electrolyte material may not suppress such thermal runaway.

However, through investigation of various solid electrolyte materials, the inventors have advantageously discovered a solid electrolyte material which exhibits high ionic conductivity characteristics at a battery-usage temperature, e.g., room temperature to about 200° C., and exhibits reduced ionic conductivity after a phase transition. The phase transition may occur at an elevated temperature, e.g., a temperature at which there is a risk of thermal runaway. In an all-solid secondary battery including such a solid electrolyte material, a phase transition may be induced when overheating occurs, thus reducing the ionic conductivity in the all-solid secondary battery and suppressing the charging reaction. As a result, it is possible to suppress thermal runaway in the all-solid secondary battery.

Disclosed is an all-solid secondary battery including: a cathode layer containing a cathode active material; an anode layer; and a solid electrolyte layer between the cathode layer and the anode layer, wherein at least one of the cathode layer, the anode layer, or the solid electrolyte layer includes a phase-transition solid electrolyte material, wherein upon heating, the phase-transition solid electrolyte material undergoes a phase transition from a first phase to a second phase, and the second phase has an ionic conductivity that is less than an ionic conductivity of the first phase.

2. Structure of all-Solid Secondary Battery

2.1. First Embodiment

A structure of an all-solid secondary battery according to an embodiment will be described with reference to FIG. 1. FIG. 1 is a schematic cross-sectional view illustrating a structure of an all-solid secondary battery 1 according to a first embodiment. The all-solid secondary battery 1 may be a secondary battery including a solid electrolyte material as an electrolyte. The all-solid secondary battery 1 may be an all-solid lithium ion secondary battery in which lithium ions migrate between a cathode layer 10 and an anode layer 30.

As illustrated in FIG. 1, the all-solid secondary battery 1 may include a cathode layer 10, a solid electrolyte layer 20, and an anode layer 30. In the present embodiment, at least one of the cathode layer 10, the solid electrolyte layer 20 or the anode layer 30 may include a solid electrolyte material which is able to transit to a phase having lower ionic conductivity, by heating.

Cathode Layer

The cathode layer 10 may include a cathode current collector 11 and a cathode active material layer 12. For example, the cathode current collector 11 may be in the form of a plate or a thin film comprising at least one of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may be disposed between the cathode current collector 11 and the solid electrolyte layer 20, and may be in contact with each of the cathode current collector 11 and the solid electrolyte layer 20. The cathode active material layer 12 may include a cathode active material. The cathode active material layer 12 may further include a conducting agent for supplementing electronic conductivity and a solid electrolyte material for supplementing ionic conductivity.

The cathode active material may include a cathode active material which is able to reversibly absorb or desorb (e.g., incorporate or deincorporate) lithium ions.

For example, the cathode active material may be at least one composite oxide of lithium with at least one metal including cobalt, manganese, or nickel. For example, the cathode active material may be a compound represented by at least one of the following formula: $Li_aA_{1-b}B^1{}_bD^1{}_2$ (wherein $0.90 \leq a \leq 1.8$ and $0 \leq b \leq 0.5$); $Li_aE_{1-b}B^1{}_bO_{2-c}D^1{}_c$ (wherein $0.90 \leq a \leq 1.8$, $0 \leq b \leq 0.5$, and $0 \leq c \leq 0.05$); $LiE_{2-b}B^1{}_bO_{4-c}D^1{}_c$ (wherein $0 \leq b \leq 0.5$, and $0 \leq c \leq 0.05$); $Li_aNi_{1-b-c}Co_bB^1{}_cD^1{}_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cD^1{}_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI^1O_2$, $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$.

In the formulae above, A may be Ni, Co, Mn, or a combination thereof; $B^1$ may be Al, Ni, Co, Mn, Cr, Fe, Mg, Sr, V, a rare earth element, or a combination thereof; $D^1$ may be O, F, S, P, or a combination thereof; E may be Co, Mn, or a combination thereof; $F^1$ may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

For example, the cathode active material may be prepared using a lithium salt such as lithium cobalt oxide (LCO), lithium nickel oxide, lithium nickel cobalt oxide, lithium nickel cobalt aluminum oxide (NCA), lithium nickel cobalt manganese oxide (NCM), lithium manganese oxide or lithium iron phosphate, nickel sulfide, copper sulfide, sulfur (sulfur element), a sulfur compound, iron oxide, or vanadium oxide. These cathode active materials may be used alone or in combination.

Among the above-listed lithium salts, the cathode active material may include a lithium salt of a transition metal oxide having a layered rocksalt-type structure, where the lithium salt of the transition metal oxide comprises lithium, and at least one of Ni, Co, Mn or Al. For example, the cathode active material may include a lithium salt having a layered rocksalt-type structure. As used herein, the expression "layered" indicates a form of a thin sheet. The term "rocksalt-type structure" refers to a sodium chloride (NaCl)-type crystal structure, and in particular, a structure in which face-centered cubic (fcc) lattices formed by respective cations and anions are disposed in a way that ridges of the unit lattices are shifted by ½.

The lithium salt of a transition metal oxide having such a layered rocksalt-type structure may be a ternary lithium transition metal oxide, for example, $LiNi_xCo_yAl_zO_2$ (NCA) or $LiNi_xCo_yMn_zO_2$ (NCM) (wherein $0<x<1$, $0<y<1$, $0<z<1$, $x+y+z=1$, $0<x'<1$, $0<y'<1$, $0<z'<1$, and $x'+y'+z'=1$).

When the cathode active material includes such a lithium salt of a transition metal oxide having a layered rocksalt-type structure, a relative high charging voltage may be obtained, and the all-solid secondary battery 1 may have improved energy density and thermal stability.

The cathode active material may be covered with a coating layer. In an embodiment, the coating layer may be any coating layer suitable for a cathode active material of an all-solid secondary battery. The coating layer may include, for example, $Li_2O$—$ZrO_2$.

When the cathode active material includes, for example, a ternary lithium transition metal oxide including Ni, such as NCA or NCM, the all-solid secondary battery 1 may have an increased capacity density, and elution of metal ions from the cathode active material may be reduced in a charged state As a result, the all-solid secondary battery 1 may have improved long-term reliability and cycle characteristics in a charged state.

The cathode active material may include at least one of elemental sulfur (sulfur element) or a sulfur compound. The elemental sulfur and the sulfur compound may increase a specific capacity of the battery, as compared with an oxide-based cathode active material. Advantageously, the elemental sulfur may have a specific capacity of 1600 milliampere hours per gram (mAh/g). For example, the sulfur compound may be at least one of $Li_2S$, a transition metal sulfide, or a sulfur-containing polymer material.

The cathode active material may be in the form of a particle having, for example, a true-spherical particle shape or an oval-spherical particle shape. The particle diameter of the cathode active material is not particularly limited, and may be in a range applicable to a cathode active layer of an all-solid secondary battery. An amount of the cathode active material in the cathode active material layer 12 is not particularly limited, and may be in a range applicable to a cathode layer of an all-solid secondary battery.

A solid electrolyte material included in the cathode active material layer 12 may be the same as or different from the solid electrolyte material included in the solid electrolyte layer 20. Details of the solid electrolyte material will be provide below in connection with the solid electrolyte layer 20.

The cathode active material layer 12 may further include an additive, for example, at least one of a conducting agent, a binder, a filler, a dispersing agent, or an ion-conducting agent, which may be appropriately combined (e.g., mixed) with the above-described cathode active material and solid electrolyte material.

The conducting agent which may be included in the cathode active material layer 12 may be, for example, at least one of graphite, carbon black, acetylene black, ketjen black, carbon fiber, carbon nanofiber, or metal powder. The binder which may be included in the cathode active material layer 12 may be, for example, at least one of styrene-butadiene rubber: (SBR), polytetrafluoroethylene, polyvinylidene fluoride, or polyethylene. The filler, the dispersing agent, or the ion-conducting agent which may be included in the cathode active material layer 12 may be any material suitable for use in an electrode of an all-solid secondary battery.

Solid Electrolyte Layer

The solid electrolyte layer 20 may be disposed between the cathode layer 10 and the anode layer 30, and may include a phase-transition solid electrolyte material. In the all-solid secondary battery 1, at least one of the cathode layer 10, the anode layer 30, or the solid electrolyte layer 20 may include a phase-transition solid electrolyte material, wherein upon heating, the phase-transition solid electrolyte material may undergo a phase transition from a first phase to a second phase, and the second phase may have a lower ionic conductivity than the ionic conductivity of the first phase. Hereinafter, a representative phase-transition solid electrolyte material will be described.

A phase-transition solid electrolyte material A (hereinafter, referred to as "solid electrolyte material A") is a solid electrolyte material which may form two phases, a first phase (a low-temperature phase) present in an operating condition, and a second phase (high-temperature phase) present at a high-temperature condition, wherein the second phase has a lower ionic conductivity than the ionic conductivity of the first phase. For example, in the first phase, the phase-transition solid electrolyte material A may have an amorphous structure, and in the second phase, the phase-transition solid electrolyte material A may have a partially crystalline or fully crystalline structure.

In the all-solid secondary battery 1, due to the inclusion of the solid electrolyte material A, during battery operation, lithium ions may be transferred between the layers or into each layer by the first phase having a relatively high ionic conductivity. As a result, the all-solid secondary battery 1 may sufficiently exhibit excellent battery performance. When the all-solid secondary battery 1 reaches a certain temperature due to heat generation within the battery, lithium ion transfer in the all-solid secondary battery 1 may be inhibited by the second phase having a relatively low ionic conductivity, and a charging reaction or other exothermic reaction may be inhibited. For these reasons, heat generation may be further suppressed in the all-solid secondary battery 1, thereby preventing thermal runaway.

Although it is sufficient that the solid electrolyte material A has the above-described function, when the cathode active material layer 12 is able to form a second phase at a temperature equal to or less than a decomposition temperature of the cathode active material, heat generation caused by the decomposition reaction of the cathode active material may be prevented.

The first phase, or low temperature phase, is a temperature in a range of greater than or equal to about 0° C. and less than or equal to about 200° C., or about 10° C. to less than or equal to about 200° C., or about 15° C. to less than or equal to about 200° C., or from room temperature (e.g., about 20 to 25° C., or about 23° C.) to less than or equal to about 200° C. The temperature at which the second phase is formed is not specifically limited. The second phase of the solid electrolyte material A may be formed in a temperature range of about 200° C. or greater to about 300° C. or less, or about 200° C. or greater to about 250° C. or less. The formation of the second phase of the solid electrolyte material A suppresses a decomposition reaction of the cathode active material and other components of the all-solid secondary battery 1 as well, and consequently suppresses heat generation. In addition, such heat generation is suppressed at a comparatively early stage, i.e., before thermal runaway can occur.

The inventors have unexpectedly discovered, that certain sulfide-based solid electrolyte materials, including $Li_2S$ and $P_2S$, exhibit the above-described functions for solid electrolyte material A.

For example, the solid electrolyte material A may include at least one sulfide represented by Formula (6).

$$aLi_2S\text{-}(1\text{-}a)P_2S_6 \qquad (6)$$

wherein, in Formula (6), $0.7 < a < 0.9$.

The sulfide represented by Formula (6) may have a comparatively high ionic conductivity in an amorphous phase (first phase) and a reduced ionic conductivity in a second phase formed through crystallization of the sulfide by heating to about 200° C. or greater.

In Formula (6), a may be 0.72 or greater and 0.8 or less.

For example, the solid electrolyte material A may include at least one sulfide represented by Formula (1).

$$bLiX\text{-}(1\text{-}b)(cLi_2S\text{-}(1\text{-}c)P_2S_5) \qquad (1)$$

wherein, in Formula (1),
$0 \leq b \leq 0.7$,
$0.6 \leq c \leq 0.9$, and
X may be at least one of Cl, Br or I.

For example, Formulae (1) to (6) may be represented by Formulae (7) to (12), respectively.

$$xbLiX\text{-}x(1\text{-}b)(cLi_2S\text{-}(1\text{-}c)P_2S_5) \qquad (7)$$

In Formula (7),
$0.01 \leq b \leq 0.7$
$0.6 \leq c \leq 0.9$,
x may be a positive natural number, and
X may be at least one selected from the group consisting of Cl, Br, and I.

$$xd(eLiBr)\text{-}(1\text{-}e)LiCl)\text{-}x(1\text{-}d)Li_3PS_4 \qquad (8)$$

$$xd(eLiBr)\text{-}(1\text{-}e)LiCl)\text{-}2x(1\text{-}d)(0.75Li_sS\text{-}0.25P_2S_5) \qquad (9)$$

In Formula (8) and Formula (9), d and e are each independently
$0.1 \leq d \leq 0.7$,
$0 \leq e \leq 1$, and
x may be a positive natural number.

$$d(eLiBr)\text{-}(1\text{-}e)LiCl)\text{-}(1\text{-}d)Li_3PS_4 \qquad (10)$$

$$d(eLiBr)\text{-}(1\text{-}e)LiCl)\text{-}2x(1\text{-}d)(0.75Li_sS\text{-}0.25P_2S_5) \qquad (11)$$

In Formula (10) and Formula (11), d and e are each independently
$0.1 \leq d \leq 0.7$,
$0 \leq e \leq 1$, and
x may be a positive natural number, $$aLi_2S\text{-}(1\text{-}a)P_2S_6 \qquad (12)$$

In Formula (12),
$0.7 < a < 0.9$, and
x may be a positive natural number.

The sulfide represented by Formula (1) may have a first phase, which may be an amorphous phase, or may be a partially crystalline or crystalline phase obtained by heating the sulfide at a temperature below the temperature at which the second phase is formed. The sulfide represented by Formula (1) may have a comparatively high ionic conductivity in the first phase. The sulfide represented by Formula (1) may form a second phase through crystallization by heating to a temperature of about 200° C. or greater to about 300° C. or less, and thus have reduced ionic conductivity.

In Formula (1), b may be 0 or greater and 0.5 or less, 0.1 or greater and 0.7 or less, or 0.2 or greater to 0.67 or less; and c may be 0.7 or greater and 0.8 or less.

Among the solid electrolyte material A represented by Formula 1, for example, the solid electrolyte material A may include at least one sulfide represented by Formula (2) or Formula (3).

$$d(eLiBr\text{-}(1\text{-}e)LiCl)\text{-}(1\text{-}d)Li_3PS_4 \qquad (2)$$

$$d(eLiBr\text{-}(1\text{-}e)LiCl)\text{-}2(1\text{-}d)(0.75Li_2S\text{-}0.25P_2S_5) \qquad (3)$$

In Formula (2) and Formula (3), d and e are each independently
$0 \leq d \leq 0.7$, and
$0 \leq e \leq 1$.

Specifically, the sulfide represented by Formula (2) and Formula (3) may have excellent ionic conductivity in the first phase. These sulfides do not include iodine/iodide as a constituent element. Iodine ions (iodide) have an oxidation-reduction potential at about 3.1 volts (V), and are reduced during charge and discharge of the all-solid secondary battery 1, thus deteriorating the solid electrolyte material. Since the sulfide represented by Formula (2) or Formula (3) does not include iodine, during charge and discharge of the all-solid secondary battery, side reactions with iodide are prevented, and as a result, capacity of the all-solid secondary battery may be increased. In other words, the sulfide represented by Formula (2) or Formula (3) may prevent side reactions with iodide during charge and discharge of the all-solid secondary battery, thereby maintaining the charge and discharge characteristics of the all-solid secondary battery 1 for an longer period of time, and further improving cycle characteristics of the all-solid secondary battery 1.

In Formula (2) and Formula (3), d may be equal to or greater than 0 and equal to or less than 0.5, equal to or greater than 0.1 and equal to or less than 0.5, or equal to or greater than 0.3 and equal to or less than 0.4; and e may be equal to or greater than 0.5 and equal to or less than 1, equal to or greater than 0.6 and equal to or less than 0.9, or equal to or greater than 0.76 and equal to or less than 0.85.

After synthesis, the solid electrolyte material A may be used in an amorphous state. Alternatively, the solid electrolyte material A may be thermally treated to form a partially crystalline or crystalline state, but at a temperature in which the second phase is not formed, so as to inhibit the formation of the second phase. That is, the solid electrolyte material A is prepared and used not through the thermal treatment at a temperature region in which the second phase is formed.

The solid electrolyte layer 20 may include an additional solid electrolyte material other than the above-described solid electrolyte material A. The additional solid electrolyte material may be, for example, $Li_2S$—$P_2S_5$, $Li_2S$—$P_2S_5$—LiX (wherein X is a halogen element, for example, I, Br, or Cl), $Li_2S$—$P_2S_5$—$Li_2O$, $Li_2S$—$P_2S_5$—$Li_2OLiI$, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_8$—LiI, $Li_2S$—$SiS_2$—$P_2S_5$—LiI, $Li_2SB_2S_3$, $Li_2S$—$P_2S_5$—$Z_mS_n$ (wherein m and n may be independently 1 to 10, and Z may be Ge, Zn, or Ga), $Li_2S$—$GeS_2$, $Li_2S$—$SiS_2$—$PO_4$, or $Li_2S$—$SiS_2$-$Li_pMO_q$ (wherein p and q may be independently 1 to 10, and M may be P, Si, Ge, B, Al, Ga, or In). These solid electrolyte materials may be prepared by treating starting source materials (for example, $Li_2S$, $P_2S_5$, or the like) using a melt quenching method or a mechanical milling method. After these treatments, an additional thermal treatment may also be performed. These solid electrolyte materials may be amorphous or crystalline, or may be in a mixed phase state thereof.

For example, among these solid electrolyte materials, a material containing sulfur and at least one element of Si, P, or B may be used. By using such a material, the solid electrolyte layer 20 may have improved lithium conductivity, and the all-solid secondary battery 1 may have improved battery characteristics. In particular, as the solid electrolyte material, a material including, as constituent elements, at least sulfur (S), phosphorous (P), and lithium (Li), for example, including $Li_2S-P_2S_5$, may be used.

When, as the solid electrolyte material, a sulfide-based solid electrolyte material including $Li_2S-P_2S_5$ is used, a mixed mole ratio of $Li_2S$ and $P_2S_5$ ($Li_2S:P_2S_5$) may be selected from, for example, a range of 50:50 to 90:10, or about 50:50 to about 80:20, or about 60:40 to about 80:20, or about 60:40 to about 75:25.

When the solid electrolyte layer 20 includes both the solid electrolyte material A and additional solid electrolyte material, the amount of the solid electrolyte material A in the solid electrolyte layer 20 may be, for example, about 20 mass percent (mass %) or greater, or about 30 mass % or greater, or about 50 mass % or greater, or about 20 mass % to about 85 mass %, or about 30 mass % to about 80 mass %, or about 50 mass % to about 75 mass %, in order to obtain an effective shutdown function by the solid electrolyte material A.

When a layer other than the solid electrolyte layer 20 (e.g., cathode layer or anode layer) includes the solid electrolyte material A, the solid electrolyte layer 20 does not include the solid electrolyte material A.

The solid electrolyte layer 20 may further include a binder. The binder which may be included in the solid electrolyte layer 20 may be, for example, at least one of styrene butadiene rubber (SBR), polytetrafluoroethylene, polyvinylidene fluoride, or polyethylene oxide. The binder in the solid electrolyte layer 20 may be the same as or different from the binder in the cathode active material layer 12.

Anode Layer

As illustrated in FIG. 1, according to an embodiment, the anode layer 30 may include an anode current collector 31 and an anode active material layer 32 disposed between the anode current collector 31 and the solid electrolyte layer 20. A material which constitutes the anode current collector 31, may be, for example, at least one of indium (In), copper (Cu), magnesium (Mg), stainless steel, titanium (Ti), iron (Fe), cobalt (Co), nickel (Ni), zinc (Zn), aluminum (Al), or germanium (Ge). The anode current collector 31 may consist essentially of or consist of one of these metals, or an alloy of two or more of these metals, or a combination thereof. The anode current collector 31 may be, for example, in the form of a plate or film.

As an anode active material of the anode active material layer 32, a compound which forms an alloy or a compound with lithium may be used, and at the same time the anode current collector 31 may consist of a material which does not react with lithium, i.e., does not form an alloy or a compound with lithium when the anode active material has a smaller capacity than a cathode active material of the cathode active material layer 12. Such materials may be, for example, at least one of copper (Cu), magnesium (Mg), stainless steel, titanium (Ti), iron (Fe), cobalt (Co), nickel (Ni), or germanium (Ge).

The anode active material layer 32 may be disposed between the anode current collector 31 and the solid electrolyte layer 20. The anode active material layer 32 may include an anode active material which forms an alloy or a compound with lithium. In the present embodiment, when the anode active material layer 32 includes such an anode active material, lithium metal may be deposited on the anode active material layer 32.

First, at an initial stage of charging, as the anode active, which is capable of forming an alloy or compound with lithium, forms an alloy or compound with lithium ions, the lithium may be absorbed into the anode active material layer 32. After the capacity of the anode active material layer 32 is exceeded, lithium metal is deposited on one or both surfaces of the anode active material layer 32, thereby forming a lithium metal layer. Since the lithium metal layer is formed by diffusion of lithium metal through the anode active material, the lithium metal layer may be a substantially uniform lithium metal layer (i.e., a layer having a substantially uniform thickness across the entire area of the layer) formed along the surface of the anode active material layer 32, not in a dendrite form. During discharge, lithium metal in the anode active material layer 32 and the lithium metal layer may be ionized and migrate toward the cathode layer 10. As a result, lithium may be used as the anode active material, and thus energy density may be improved.

Furthermore, when the lithium metal layer is formed between the anode active material layer 32 and the anode current collector 31, the lithium metal layer may be covered by the anode active material layer 32. Accordingly, the anode active material layer 32 may function as a protective layer for the lithium metal layer. Accordingly, a short circuit and capacity reduction of the all-solid secondary battery may be suppressed, and furthermore, characteristics of the all-solid secondary battery may be improved.

As a method which enables deposition of metal lithium on the anode active material layer 32, a charge capacity of the cathode active material layer may be greater than the charge capacity of the anode active material layer. In particular, a charge capacity ratio of a charge capacity b (in milliampere hours, mAh) of the anode active material layer (anode layer) to a charge capacity a (in mAh) of the cathode active material layer (cathode layer 10) may satisfy the relationship represented by formula (I).

$$0.002 < b/a < 0.5 \qquad (I)$$

The capacity ratio may be about 0.003 or greater, or about 0.005 or greater, or about 0.01 or greater, or about 0.05 or greater, or may be about 0.003 to about 0.4, or about 0.005 to about 0.3, or about 0.01 to about 0.1. When the capacity ratio represented by formula (I) is 0.002 or less, characteristics of the all-solid secondary battery 1 may deteriorate depending on the configuration of the anode active material layer 32. Without being limited by theory, it is understood that this occurs because the anode active material layer may not sufficiently mediate the deposition of the lithium metal from the lithium ions, and as a result the formation of the lithium metal layer does not properly proceed. In this case, through repetition of charge and discharge cycles, the anode active material layer 32 may collapse, and dendrite is likely to be precipitated and grown. As a result, characteristics of the all-solid secondary battery 1 may be deteriorated. When the lithium metal layer is formed between the anode active material layer 32 and the anode current collector 31, the anode active material layer 32 may not sufficiently function as a protective layer.

When the capacity ratio is 0.5 or greater, the anode active material layer 32 may store most of the lithium, and the metal layer may not be sufficiently formed depending on the configuration of the anode active material layer 32. The capacity ratio may be 0.1 or less, or 0.04 or less, or 0.01 or less.

The anode active material for achieving the above-described function may include, for example, at least one of amorphous carbon, gold (Au), platinum (Pt), palladium (Pd), silicon (Si), silver (Ag), aluminum (Al), bismuth (Bi), tin (Sn), antimony, or zinc (Zn). The amorphous carbon may be, for example, at least one of carbon black (such as acetylene black, furnace black, ketjen black, and the like), or graphene.

The shape of the anode active material is not specifically limited. The anode active material may be in particulate form. For example, the anode active material may form a uniform layer, for example, a plated layer. When the anode active material is in particulate form, lithium ions may pass through spaces between the particles of the anode active material to form a lithium metal layer between the anode active material layer 32 and the anode current collector 31. When the anode active material is a uniform layer, a metal layer may be precipitated between the anode active material layer 32 and solid electrolyte layer 20.

For example, the anode active material layer 32 may include a combination of a small-specific surface area amorphous carbon having a specific surface area of about 100 square meters per gram ($m^2/g$) or less and a large-specific surface area amorphous carbon having a specific surface area of about 300 $m^2/g$ or greater, both as measured by a nitrogen gas adsorption method.

The anode active material layer 32 may include at least one anode active material. For example, the anode active material layer 32 may include, as the anode active material, only amorphous carbon, or may include at least one of gold, platinum, palladium, silicon, silver, aluminum, bismuth, tin, antimony, or zinc. The anode active material layer 22 may include a mixture of amorphous carbon and at least one of gold, platinum, palladium, silicon, silver, aluminum, bismuth, tin, antimony, or zinc. In a mixture of amorphous carbon and a metal such as gold and the like, a mixing ratio (by mass) of the amorphous carbon to the metal may be about 1:1 to about 1:3. When the anode active material consists of these materials, the all-solid secondary battery 1 may have further improved characteristics.

When the amorphous carbon and at least one of gold, platinum, palladium, antimony, silicon, silver, aluminum, bismuth, tin, or zinc are used together as the anode active material, the anode active material may have a particle diameter of about 4 micrometers (μm) or less, or about 1 μm or less, or about 0.5, or about 1 μm or less. In this case, the all-solid secondary battery 1 may have further improved characteristics. For example, the particle diameter of the anode active material may be obtained by calculating an arithmetic mean of the original diameters of individual anode active material particles on the basis of electron microscope images (for example, scanning electron microscope images). For example, the particle diameter of the anode active material may be the volume-based median value ($D_{50}$) obtained by using a laser diffraction particle size distribution analyzer. Such a median particle diameter is substantially the same as the arithmetic mean of particle diameters calculated on the basis of the electron microscope images. A lower limit of the particle diameters is not particularly limited. For example, the lower limit of the particle diameters is about 0.01 μm or greater. For example the anode active material may have a particle diameter of about 0.01 μm to about 4 μm, or about 0.05 μm to about 1 μm, or about 0.1 μm to about 0.5 μm.

When a material alloyable with lithium, for example, at least one of gold, platinum, palladium, antimony, silicon, silver, aluminum, bismuth, tin, or zinc is used as the anode active material, the anode active material layer 32 may be a layer including these metals. For example, the metal layer may be a plated layer.

A charge capacity of the cathode active material layer 12 may be obtained by multiplying a charge specific capacity (e.g., in milliampere hours per gram, mAh/g) of a cathode active material by a mass of the cathode active material in the cathode active material layer 12. When various kinds of cathode active materials are used, the multiplication value of a charge specific capacity multiplied by a relative mass of each cathode active material may be calculated, and a total sum of the multiplication values of the individual cathode active materials is used as the charge capacity of the cathode active material layer 12. A charge capacity of the anode active material layer 32 may be calculated in the same manner. That is, the charge specific capacity of the anode active material layer 32 may be obtained by multiplying a charge specific capacity (mAh/g) of an anode active material by a mass of the anode active material in the anode active material layer 32. When various kinds of anode active materials are used, the multiplication value of a charge specific capacity multiplied by a relative mass of each anode active material may be calculated, and a total sum of the multiplication values of the individual anode active materials used as the capacity of the anode active material layer 32. The charge specific capacity of the cathode active material and the charge specific capacity of the anode active material are estimated by using an all-solid half cell including lithium metal as a counter electrode. In practice, the charge capacities of the cathode active material layer 12 and the anode active material layer 32 are directly measured using an all-solid half cell. The charge capacity densities of the cathode active materials and the anode active materials are calculated from the measured charge capacity and mass of the respective active materials.

For example, the anode active material layer 32 may further include a binder. For example, the binder may include at least one of styrene butadiene rubber (SBR), polytetrafluoroethylene, polyvinylidene fluoride, or polyethylene. As such, by the inclusion of the binder, specifically when the anode active material is in particulate form, deintercalation of the anode active material may be prevented. When the anode active material layer 22 includes a binder, the amount of the binder may be, for example, about 0.3 mass % to about 20 mass %, about 1 mass % to about 15 mass %, or about 3 mass % to about 15 mass %, based on a total mass of the anode active material layer 22.

The anode active material layer 32 may further include an additive suitable for use in an all-solid secondary battery, for example, at least one of a filler, a dispersing agent, or an ion conducting agent, may be appropriately mixed.

When the anode active material is in particulate form, a thickness of the anode active material layer 32 is not specifically limited, and for example, may be about 1 μm to about 20 μm, or about 1 μm to about 10 μm, or about 1 μm to about 7 μm. This thickness may sufficiently ensure the above-described effect of the anode active material layer 32 and reduce a resistance value of the anode active material layer 32, thus sufficiently improving the characteristics of the all-solid secondary battery 1.

When the anode active material is a uniform layer, a thickness of the anode active material layer 32 may be, for example, about 1 nm to about 100 nm. In this case, the thickness of the anode active material layer 32 may be about 1 nm to about 95 nm, or about 1 nm to about 90 nm, or about 1 nm to about 50 nm.

In an embodiment, the anode active material layer 32 may include a material which does not include lithium. More specifically, the anode active material layer 32 of the anode layer 30 may not include lithium. In other embodiments, in the anode active material layer 32 of the anode layer 30, the amount of lithium by mass per unit area may be greater than 0% and equal to or less than 5%, or greater than 0% and equal to or less than 2%, or greater than 0% and less than 1%, based on the total amount of lithium in the cathode active material per unit area of the cathode active material layer.

The anode active material layer 32 is not limited to the above-described anode active material layer 32. For example, the anode active material layer 32 may employ any configuration applicable to an anode active material layer of an all-solid secondary battery.

For example, the anode active material layer 32 may be a layer including an anode active material, a solid electrolyte material, and a conducting agent which may be used in the anode layer.

In this case, for example, the anode active material may be a metal active material or a carbon active material. The metal active material may be, for example, at least one metal of lithium (Li), indium (In), aluminum (Al), tin (Sn), silicon (Si), or an alloy of these metals. The carbon active material may be, for example, at least one of artificial graphite, graphite carbon fiber, resin-sintered carbon, pyrolytic vapor-grown carbon, coke, mesocarbon microbead (MCMB), furfuryl alcohol, polyacene, pitch-based carbon fiber, vapor-grown carbon fiber, natural graphite, or non-graphitizable carbon. These anode active materials may be used alone or as a combination of at least two thereof.

As above, the all-solid secondary battery 1 according to a first embodiment is described. According to the present embodiment, at least one of the cathode layer 10, the solid electrolyte layer 20, or the anode layer 30 in the all-solid secondary battery 1 may include the solid electrolyte material A. This enables the all-solid secondary battery 1 to exhibit sufficient battery performance during operation, due to the solid electrolyte material layer A in a first phase having a high ionic conductivity. When the all-solid secondary battery 1 is overheated, the solid electrolyte material A may undergo a phase transition to a second phase, thus increasing an internal resistance of the all-solid secondary battery 1 and suppressing electrochemical reactions in the all-solid secondary battery 1. As a result, additional heat generation and thermal runaway in the all-solid secondary battery 1 may be prevented. Accordingly, electrochemical reactions in the all-solid secondary battery 1 may be suppressed.

Although the first embodiment is described focusing on the case where the solid electrolyte material A is included in the solid electrolyte layer 20, the solid electrolyte material A may be included in the cathode layer 10 (the cathode active material layer 12) and/or the anode layer 30 (the anode active material layer 32). For example, the solid electrolyte material A is included in at least one of the cathode layer or the anode layer, and may not be included in the solid electrolyte layer 20. In this case, a percentage of the solid electrolyte material A in each of the cathode active material layer 12 and the anode active material layer 32 may be, for example, about 20 mass % or greater, or about 50 mass % or greater, for example about 20 mass % to about 80 mass %, or about 30 mass % to about 75 mass %, or about 50 mass % to about 75 mass %, based on the total weight of the cathode active material layer and the anode active material layer, in order to secure a shutdown function.

2.2. Second Embodiment

Figure 2:
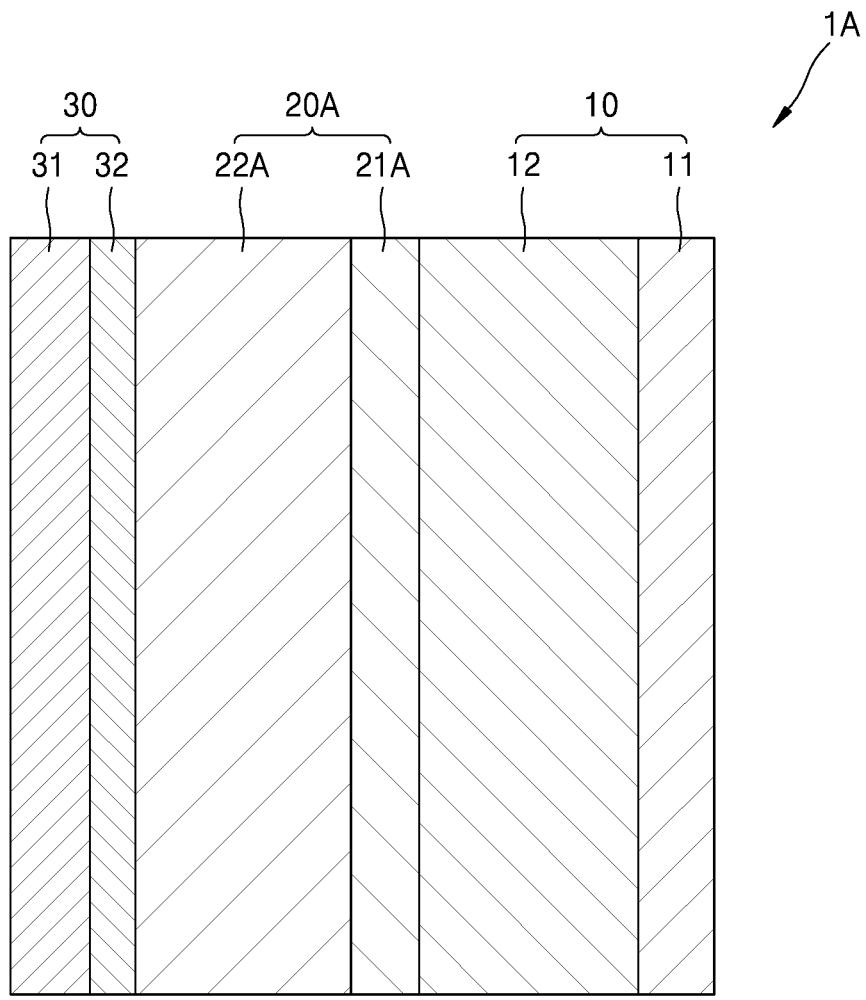
FIG. 2 is a schematic cross-sectional view illustrating a structure of an all-solid secondary battery, according to a second embodiment.

Next, a structure of an all-solid secondary battery 1A according to a second embodiment will be described with reference to FIG. 2. FIG. 2 is a schematic cross-sectional view illustrating a layer structure of the all-solid secondary battery 1A according to a second embodiment. Hereinafter, the second embodiment will be described focusing on differences between the second embodiment and the above-described first embodiment, and any overlap between the two will be omitted.

The all-solid secondary battery 1A illustrated in FIG. 2 is different from the above-described first embodiment in that a solid electrolyte layer 20A includes a first solid electrolyte layer 21A and a second solid electrolyte layer 22A.

The first solid electrolyte layer 21A, is disposed on a side of the solid electrolyte 20A adjacent to the cathode layer 10, and may include at least the solid electrolyte material A. The first solid electrolyte layer 21A may include about 50 mass % or greater of the solid electrolyte material A, or may consist essentially of the solid electrolyte material A, or may consist of the solid electrolyte material A.

The first solid electrolyte layer 21A forms a uniform layer, and thus the ionic conductivity of the first solid electrolyte layer 21A including the solid electrolyte material A may be uniformly reduced across the entire layer when abnormal heat generation occurs. Accordingly, it may be possible to more reliably prevent abnormal heat generation due to a localized current concentration.

The second solid electrolyte layer 22A may include any solid electrolyte material. As such, as the first solid electrolyte layer 21A having a shutdown function is separately provided, the second solid electrolyte layer 22A may include any solid electrolyte material appropriately selected according to the performance of the all-solid secondary battery 1.

2.3. Third Embodiment

Figure 3:
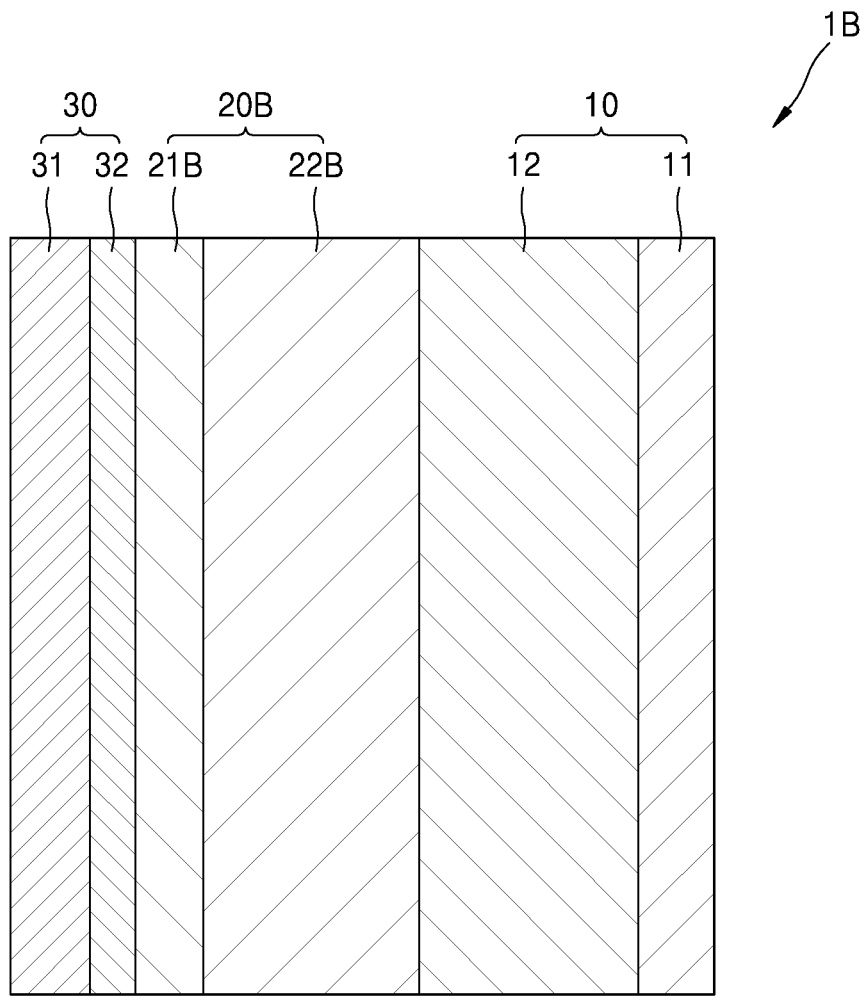
FIG. 3 is a schematic cross-sectional view illustrating a structure of an all-solid secondary battery, according to a third embodiment.

Next, a structure of an all-solid secondary battery 1B according to a third embodiment will be described with reference to FIG. 3. FIG. 3 is a schematic cross-sectional view illustrating a layer structure of the all-solid secondary battery 1B according to a third embodiment.

The all-solid secondary battery 1B illustrated in FIG. 3 is different from the above-described first embodiment in that a solid electrolyte layer 20B includes a first solid electrolyte layer 21B and a second solid electrolyte layer 22B.

The first solid electrolyte layer 21B, is disposed adjacent to the anode layer 30, and may include at least the solid electrolyte material A. The second solid electrolyte layer 22B may include about 50 mass % or greater of the solid electrolyte material A, or may consist essentially of the solid electrolyte material A, or may consist of the solid electrolyte material A. The second solid electrolyte layer 22B may include any solid electrolyte material.

The all-solid secondary battery 1B as described above may also exhibit the same function as that of the above-described all-solid secondary battery 1A.

2.4. Forth Embodiment

Figure 4:
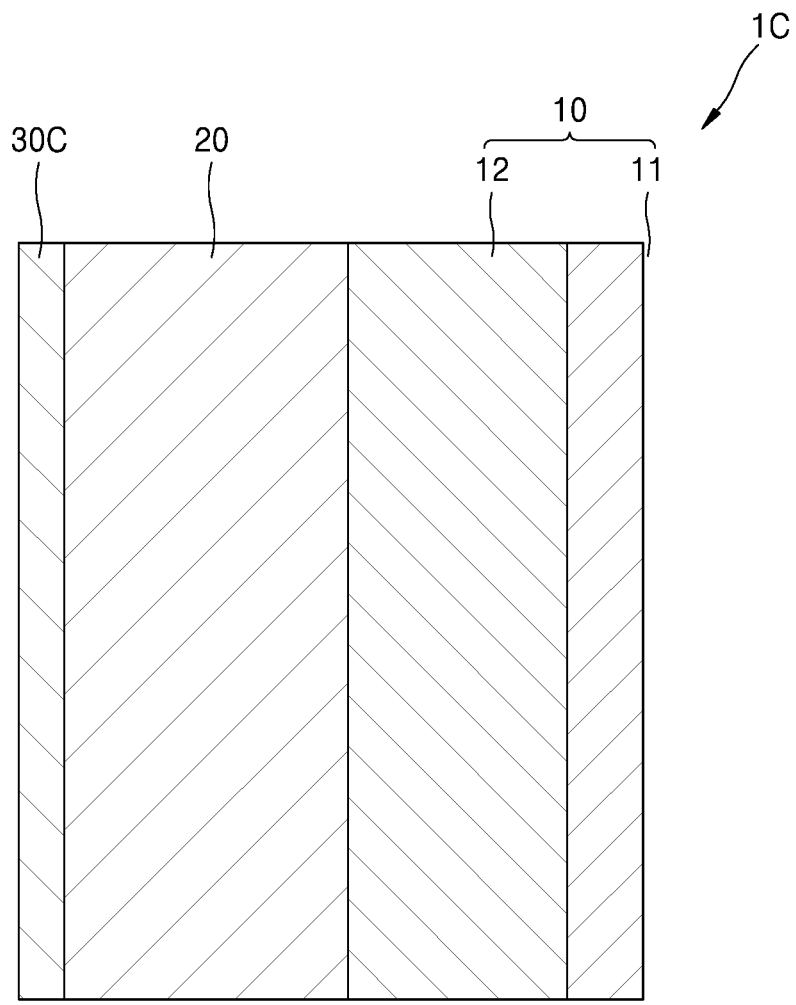
FIG. 4 is a schematic cross-sectional view illustrating a structure of an all-solid secondary battery, according to a fourth embodiment.

Next, a structure of an all-solid secondary battery 10 according to a fourth embodiment will be described with reference to FIG. 4. FIG. 4 is a schematic cross-sectional view illustrating a structure of the all-solid secondary battery according to a fourth embodiment.

The all-solid secondary battery 10 illustrated in FIG. 4 is different from the above-described first embodiment in that an anode layer 30C is a lithium metal layer.

The anode layer 30C, as a lithium metal layer, may absorb and desorb lithium ions, and at the same time have high electronic conductivity. Accordingly, the anode layer 30C may also function as both an anode active material layer and an anode current collector, which thus may not be disposed separately. For example, the anode layer 30C may be formed by disposing a lithium metal having a plate or thin-film form.

The all-solid secondary battery 10 as described above may also exhibit the same function as that of the above-described all-solid secondary battery 1A.

Example embodiments of the all-solid secondary battery are described above. However, the all-solid secondary battery according is not limited to the above-described embodiments. For example, any combination of the above-described embodiments may be applied to an all-solid secondary battery.

For example, in the all-solid secondary batteries 1A and 1B according to the above-described second and third embodiments, the anode layer 30 may be formed as a lithium metal layer, as in the fourth embodiment. For example, in the all-solid secondary battery 10 according to the fourth embodiments, an anode current collector or an anode active material layer may be additionally disposed on the anode layer 30, which is a lithium metal layer.

Although, in the above-described embodiments, the solid electrolyte material A is used in the solid electrolyte layer 20 and the cathode layer 10, embodiments of the present invention are not limited thereto. For example, the solid electrolyte material A may be used in at least one of the solid electrolyte layer 20, the cathode layer 10, or the anode layer 30. For example, an additional solid electrolyte material, in addition to the solid electrolyte material A, may be used to form the solid electrolyte layer 20, the cathode layer 10, or the anode layer 30.

3. Method of Manufacturing all-Solid Secondary Battery

Next, a method of manufacturing an all-solid secondary battery according to an embodiment as described above will be described with reference to the all-solid secondary battery 1 according to the first embodiment. For example, the all-solid secondary battery 1 according to the present embodiment may be manufactured by preparing the cathode layer 10, the anode layer 30, and the solid electrolyte layer 20, or preparing materials of the cathode layer 10, the anode layer 30, and the solid electrolyte layer 20, and then stacking the prepared layers.

Manufacture of Solid Electrolyte Layer

The solid electrolyte layer 20 may be manufactured using a solid electrolyte material A which includes, for example, a sulfide-based solid electrolyte material.

First, a starting source material may be treated using a melt quenching method or a mechanical milling method.

For example, when a melt quenching method is used, predetermined amounts of starting source materials (for example, $Li_2S$, $P_2S_5$, etc.) may be mixed and processed into the form of pellets. The pellets may be reacted in a vacuum at a predetermined reaction temperature, followed by quenching to prepare a sulfide-based solid electrolyte material. The reaction temperature of the mixture of $Li_2S$ and $P_2S_5$ may be, for example, about 400° C. to 1,000° C., or about 800° C. to 900° C. The reaction time may be about 0.1 to 12 hours, or about 1 to 12 hours. The quenching temperature of the reaction product may be usually about 10° C. or less or about 0° C. or less. The quenching rate may be about 1° C. per second (° C./sec) to about 10,000° C./sec, or about 1° C./sec to about 5,0001° C./sec, or about 1° C./sec to about 1,000° C./sec.

When a mechanical milling method is used, starting source materials (for example, $Li_2S$, $P_2S_5$, etc.) may be reacted while being agitated using, for example, a ball mill. The agitation speed and the agitation time in the mechanical milling method are not specifically limited. However, the faster the agitation speed, the faster the generation rate of the sulfide-based solid electrolyte material may become. The longer the agitation time, the higher the conversion rate of the source materials to the sulfide-based solid electrolyte material may become. The mixed source material obtained using the melt quenching method or mechanical milling method may be usually amorphous.

The mixed source material may be ground to prepare the solid electrolyte material A in particulate form. For example, after the mixed source material is crystallized or partially crystallized by thermal treatment at a predetermined temperature, the crystallized mixed source material may be ground to obtain the solid electrolyte material A in particulate form.

The thermal treatment of the mixed source material may not be performed at a temperature within a range in which the second phase is formed.

Subsequently, the solid electrolyte material A obtained through the above-described method may be formed into the solid electrolyte layer 20 by using a film formation method, for example, an aerosol deposition method, a cold spray method, a sputtering method, or the like. The solid electrolyte layer 20 may be formed by pressing solid electrolyte particles. The solid electrolyte layer 20 may be formed by mixing the solid electrolyte material, a solvent, and a binder, and coating, drying and pressing the mixture.

Manufacture of Cathode Layer

For example, the cathode layer 10 may be formed using the following method. First, a cathode active material may be prepared. The cathode active material may be prepared using a known method.

Next, the cathode active material, the previously prepared solid electrolyte material A, and an additive may be mixed together, and then the resulting mixture may be added to a solvent such as water or an organic solvent, to thereby obtain a slurry or paste. Subsequently, the obtained slurry or paste may be coated on a current collector, dried, and then pressed to thereby obtain the cathode layer 10.

Formation of Anode Layer

The anode layer 30 may be formed in the same manner as applied to the cathode layer 10. First, materials for forming the anode active material layer 32, including an anode active material, may be combined, and then the resulting mixture may be added to a solvent such as water or an organic solvent, to thereby obtain a slurry or paste. Subsequently, the obtained slurry or paste may be coated on the anode current collector 31, dried, and then pressed to thereby obtain the anode layer 30.

In some embodiments, the anode layer 30 may be obtained by applying an anode active material onto the anode current collector 31 by sputtering to thereby form the anode active material layer 32. For example, the anode layer 30 may be obtained by disposing, on the anode current collector 31, a metal foil for forming the anode active material layer 32.

Manufacture of all-Solid Secondary Battery

The solid electrolyte layer 20, the cathode layer 10, and the anode layer 30, which are formed according to the above-described methods, may be stacked on one another to thereby manufacture the all-solid secondary battery 1, according to an embodiment. In particular, the cathode layer 10, which may also serve as the solid electrolyte layer 20, and the anode layer 30 may be stacked on one another and then pressed to thereby manufacture the all-solid secondary battery 1, according to an embodiment.

4. Solid Electrolyte Material

Next, the solid electrolyte material according to embodiments will be described. During studies on all-solid secondary batteries having a shutdown function as described above, it was unexpectedly and advantageously discovered that the solid electrolyte material described herein has a first phase at a relatively lower temperature, and upon heating, has the ability to form a second phase having a lower ionic conductivity than the first phase, and at the same time improves battery characteristics of the all-solid secondary battery.

Accordingly, in as aspect, the present invention relates to a solid electrolyte material including at least one sulfide represented by Formula (4) or Formula (5).

$$d(e\text{LiBr-}(1-e)\text{LiCl})\text{-}(1-d)\text{Li}_3\text{PS}_4 \tag{4}$$

$$d(e\text{LiBr-}(1-e)\text{LiCl})\text{-}2(1-d)(0.75\text{Li}_2\text{S-}0.25\text{P}_2\text{S}_5) \tag{5}$$

In Formula (4) and Formula (5), d and e are each independently $0.1 \leq d \leq 0.7$, and
$0 \leq e \leq 1$ and The sulfide represented by Formula (4) and Formula (5) may have, as a first phase, an amorphous phase, or a partially crystalline or a crystalline phase obtained through thermal treatment of the sulfide at a temperature below the temperature at which the second phase is formed. The sulfide represented by Formula (4) and Formula (5) may have a high ionic conductivity at the first phase, and also may form a second phase through crystallization by heating to about 200° C. or greater, and thus have reduced ionic conductivity.

The sulfide may not include the element iodine or iodide ions as a constituent element. Since the compound represented by Formula (4) or Formula (5) does not include iodine/iodide, side reactions associated with iodide may be prevented during charge and discharge of the all-solid secondary battery, and consequentially the capacity of the all-solid secondary battery may be increased. The sulfide represented by Formula (4) or Formula (5) may prevent side reactions of the iodide during charge and discharge of the all-solid secondary battery 1, so that the charge and discharge characteristics of the all-solid secondary battery may be maintained for an extended period of time, and thus improving cycle characteristics of the all-solid secondary battery.

The range of the values of d and e, and the reasons therefore are as described above in connection with Formula (2) and Formula (3), and thus a detailed description thereof will be omitted.

EXAMPLES

An embodiment of the present disclosure will now be described in detail with reference to the following examples. However, these examples are only for illustrative purposes and are not intended to limit the scope of the all-solid secondary battery according to the disclosed embodiment.

45. Preparation of Solid Electrolyte Material

Example 1

$\text{Li}_2\text{S}$, $\text{P}_2\text{S}_5$, LiI, and LiBr were weighed in a total amount of 2 grams (g), so as to have a composition (weight) ratio of 0.1 LiBr:0.1 LiI:0.4 $\text{Li}_3\text{PS}_4$, and mixed in a mortar. 2 g of the mixture was put into a 45 milliliter (mL), $\text{ZrO}_2$ port, and then mixed together with $\text{ZrO}_2$ balls having diameters of 5 millimeters (mm) and 3 minutes (min) in a planetary ball mill, to thereby synthesize a solid electrolyte material. The synthesis conditions were as follows. While repeating rotation at 380 rotations per minute (rpm) for 10 minutes and resting for 5 minutes, the reaction was continued until the peak of each component completely disappeared, as analyzed by X-ray diffraction, and became amorphous. All the above-described operations were performed under an argon atmosphere ($\text{H}_2\text{O}<0.1$ ppm). The synthesized powder was subjected to Raman spectroscopy to identify a peak of 420 $\text{cm}^{-1}$, which indicates the presence of $\text{PS}_4^{3-}$ anions.

The obtained powder was thermally treated at about 150° C. under vacuum conditions so as to precipitate a crystalline phase having a high ionic conductivity, to thereby obtain a solid electrolyte material of Example 1. The obtained solid electrolyte material had an ionic conductivity of about $9.3 \times 10^{-4}$ S/cm at 25° C.

Example 2

$\text{Li}_2\text{S}$ and $\text{P}_2\text{S}_5$ were weighed in a total amount of 2 g so as to have a composition ratio of $0.75\text{Li}_2\text{S}:0.25\text{P}_2\text{S}_5$, and mixed in a mortar. 2 g of the mixture was put into a 45-mL, $\text{ZrO}_2$ port, and then mixed together with $\text{ZrO}_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous. All the above-described operations were performed under an argon atmosphere ($\text{H}_2\text{O}<0.1$ ppm). The synthesized powder was subjected to Raman spectroscopy to identify a peak of 420 $\text{cm}^{-1}$, which indicates the presence of $\text{PS}_4^{3-}$ anions.

The obtained powder was thermally treated at about 150° C. under vacuum conditions so as to precipitate a crystalline phase having a high ionic conductivity, to thereby obtain a solid electrolyte material of Example 2. The obtained solid electrolyte material had an ionic conductivity of about $4.0 \times 10^{-4}$ S/cm at 25° C.

Example 3

$\text{Li}_2\text{S}$, $\text{P}_2\text{S}_5$, and LiBr were weighed in a total amount of 2 g, so as to have a composition ratio of $\text{LiBr}:2\text{Li}_3\text{PS}_4$, and mixed in a mortar. 2 g of the mixture was put into a 45-mL, $\text{ZrO}_2$ port, and then mixed together with $\text{ZrO}_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous. All the above-described operations were performed under an argon atmosphere ($H_2O$<0.1 ppm). The synthesized powder was subjected to Raman spectroscopy to identify a peak of 420 $cm^{-1}$, which indicates the presence of $PS_4^{3-}$ anions.

The obtained powder was thermally treated at about 200° C. under vacuum conditions so as to precipitate a crystalline phase having a high ionic conductivity, to thereby obtain a solid electrolyte material of Example 3. The obtained solid electrolyte material had an ionic conductivity of about $1.3 \times 10^{-3}$ S/cm at 25° C.

Example 4

$Li_2S$, $P_2S_5$, LiBr, and LiCl were weighed in a total amount of 2 g, so as to have a composition ratio of 0.80LiBr:0.20LiCl:$2Li_3PS_4$, and mixed in a mortar. 2 g of the mixture was put into a 45-mL, $ZrO_2$ port, and then mixed together with $ZrO_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous. All the above-described operations were performed under an argon atmosphere ($H_2O$<0.1 ppm). The synthesized powder was subjected to Raman spectroscopy to identify a peak of 420 $cm^{-1}$, which indicates the presence of $PS_4^{3-}$ anions.

The obtained powder was thermally treated at about 220° C. under vacuum conditions so as to precipitate a crystalline phase having a high ionic conductivity, to thereby obtain a solid electrolyte material of Example 4. The obtained solid electrolyte material had an ionic conductivity of about $1.7 \times 10^{-3}$ S/cm at 25° C.

Example 5

$Li_2S$, $P_2S_5$, LiBr, and LiCl were weighed in a total amount of 2 g, so as to have a composition ratio of 0.75LiBr:0.25LiCl:$2Li_3PS_4$, and mixed in a mortar. 2 g of the mixture was put into a 45-mL, $ZrO_2$ port, and then mixed together with $ZrO_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous. All the above-described operations were performed under an argon atmosphere ($H_2O$<0.1 ppm). The synthesized powder was subjected to Raman spectroscopy to identify a peak of 420 $cm^{-1}$, which indicates the presence of $PS_4^{3-}$ anions.

The obtained powder was thermally treated at about 200° C. under vacuum conditions so as to precipitate a crystalline phase having a high ionic conductivity, to thereby obtain a solid electrolyte material of Example 5. The obtained solid electrolyte material had an ionic conductivity of about $1.8 \times 10^{-3}$ S/cm at 25° C.

Example 6

$Li_2S$, $P_2S_5$, LiBr, and LiCl were weighed in a total amount of 2 g, so as to have a composition ratio of 0.7LiBr:0.3LiCl:$2Li_3PS_4$, and mixed in a mortar. 2 g of the mixture was put into a 45-mL, $ZrO_2$ port, and then mixed together with $ZrO_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous. All the above-described operations were performed under an argon atmosphere ($H_2O$<0.1 ppm). The synthesized powder was subjected to Raman spectroscopy to identify a peak of 420 $cm^{-1}$, which indicates the presence of $PS_4^{3-}$ anions.

The obtained powder was thermally treated at about 200° C. under vacuum conditions so as to precipitate a crystalline phase having a high ionic conductivity, to thereby obtain a solid electrolyte material of Example 6. The obtained solid electrolyte material had an ionic conductivity of about $1.8 \times 10^{-3}$ S/cm at 25° C.

Example 7

$Li_2S$, $P_2S_5$, LiBr, and LiCl were weighed in a total amount of 2 g, so as to have a composition ratio of 0.5LiBr:0.5LiCl:$2Li_3PS_4$, and mixed in a mortar. 2 g of the mixture was put into a 45-mL, $ZrO_2$ port, and then mixed together with $ZrO_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous. All the above-described operations were performed under an argon atmosphere ($H_2O$<0.1 ppm). The synthesized powder was subjected to Raman spectroscopy to identify a peak of 420 $cm^{-1}$, which indicates the presence of $PS_4^{3-}$ anions.

The obtained powder was thermally treated at about 200° C. under vacuum conditions so as to precipitate a crystalline phase having a high ionic conductivity, to thereby obtain a solid electrolyte material of Example 7. The obtained solid electrolyte material had an ionic conductivity of about $6.3 \times 10^{-4}$ S/cm at 25° C.

Example 8

$Li_2S$, $P_2S_5$, and LiCl were weighed in a total amount of 2 g, so as to have a composition ratio of 1 LiCl:$2Li_3PS_4$, and mixed in a mortar. 2 g of the mixture was put into a 45-mL, $ZrO_2$ port, and then mixed together with $ZrO_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous. All the above-described operations were performed under an argon atmosphere ($H_2O$<0.1 ppm). The synthesized powder was subjected to Raman spectroscopy to identify a peak of 420 $cm^{-1}$, which indicates the presence of $PS_4^{3-}$ anions.

The obtained powder was thermally treated at about 200° C. under vacuum conditions so as to precipitate a crystalline phase having a high ionic conductivity, to thereby obtain a solid electrolyte material of Example 8. The obtained solid electrolyte material had an ionic conductivity of about $0.24 \times 10^{-3}$ S/cm at 25° C.

Comparative Example 1

$Li_2S$ and $P_2S_5$ were weighed in a total amount of 2 g, so as to have a composition ratio of $Li_7P_3S_{11}$, and mixed in a mortar. 2 g of the mixture was put into a 45-mL, $ZrO_2$ port, and then mixed together with $ZrO_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous, thereby obtaining the solid electrolyte material of Comparative Example 1. All the above-described operations were performed under an argon atmosphere ($H_2O$<0.1 ppm). The obtained solid electrolyte material had an ionic conductivity of about $8.0 \times 10^{-5}$ S/cm at 25° C.

Comparative Example 2

$Li_2S$, $P_2S_5$, and $GeS_2$ were weighed in a total amount of 2 g, so as to have a composition ratio of $Li_{10}GeP_2S_{12}$, and mixed in a mortar. 2 g of the mixture was put into a 45-mL, $ZrO_2$ port, and then mixed together with $ZrO_2$ balls having diameters of 5 mm and 3 min in a planetary ball mill, to thereby synthesize a solid electrolyte material. The synthesis conditions were as follows. While repeating rotation at 380 rpm for 10 minutes and resting for 5 minutes, the reaction was continued until the peak of each component completely disappeared, as analyzed by X-ray diffraction, and became amorphous, thereby obtaining the solid electrolyte material of Comparative Example 2. All the above-described operations were performed under an argon atmosphere ($H_2O$<0.1 ppm). The obtained solid electrolyte material had an ionic conductivity of about $2.2 \times 10^{-4}$ S/cm at 25° C.

2) Evaluation of Thermal Treatment

Power obtained in each of the above-described examples and comparative examples, before heating, was subjected to thermal treatment at a temperature as shown in Table 1, to form high-temperature phase crystals. Since crystal formation temperatures are different according to materials, the thermal treatment temperature and time were set to be appropriate for each material. The ionic conductivity at 25° C. of each of the obtained materials including high-temperature phase crystals was measured. The results are shown in Table 1, together with the ionic conductivities of the solid electrolyte materials of Examples 1 to 8 and Comparative Examples 1 and 2.

TABLE 1

| | Ionic conductivity (S/cm) | | Thermal treatment | |
|---|---|---|---|---|
| | Solid electrolyte material (low-temperature phase) | Material after thermal treatment (high-temperature phase) | Temperature (° C.) | Time (h) |
| Example 1 | $9.3 \times 10^{-4}$ | $2.3 \times 10^{-4}$ | 300 | 3 |
| Example 2 | $4.0 \times 10^{-4}$ | $2.3 \times 10^{-5}$ | 250 | 3 |
| Example 3 | $1.3 \times 10^{-3}$ | $3.6 \times 10^{-4}$ | 250 | 3 |
| Example 4 | $1.7 \times 10^{-3}$ | $3.0 \times 10^{-5}$ | 220 | 3 |
| Example 5 | $1.8 \times 10^{-3}$ | $3.0 \times 10^{-5}$ | 250 | 3 |
| Example 6 | $1.8 \times 10^{-3}$ | — | 200 | 3 |
| Example 7 | $6.3 \times 10^{-4}$ | $2.3 \times 10^{-4}$ | 200 | 3 |
| Example 8 | $2.4 \times 10^{-4}$ | $2.1 \times 10^{-5}$ | 200 | 3 |
| Comparative Example 1 | $8.0 \times 10^{-5}$ | $1.4 \times 10^{-3}$ | 280 | 3 |
| Comparative Example 2 | $2.2 \times 10^{-4}$ | $1.5 \times 10^{-2}$ | 475 | 3 |

Referring to Table 1, it was found that the ionic conductivity of the solid electrolyte materials of Examples 1 to 5, 7, and 8, and Comparative Examples 1 and 2 were changed by the heating. The ionic conductivities of the solid electrolyte materials of Examples 1 to 5, 7, and 8 were reduced after the heating, indicating that the solid electrolyte materials of Examples 1 to 5, 7, and 8 can form a high-temperature phase and exhibit a shutdown function when all-solid secondary batteries including the solid electrolyte materials of Examples 1 to 5, 7, and 8 are overheated.

The solid electrolyte material of Example 6 had a LiBr to LiCl ratio differing from the solid electrolyte materials of Examples 5 and 7, which is between the LiBr to LiCl ratios of the solid electrolyte materials of Examples 5 and 7, indicating that the solid electrolyte material of Example 6 can form, like the solid electrolyte materials of Examples 5 and 7, a high-temperature phase and exhibit a shutdown function when an all-solid secondary battery using the solid electrolyte material is overheated.

Meanwhile, the ionic conductivity of the solid electrolyte materials of Comparative Examples 1 and 2 were increased by the heating. This indicates that, when an all-solid secondary battery including the solid electrolyte material of Comparative Example 1 or Comparative Example 2 is overheated, due to reduction in resistance of the solid electrolyte material, a thermal runaway cannot be suppressed.

Figure 5:
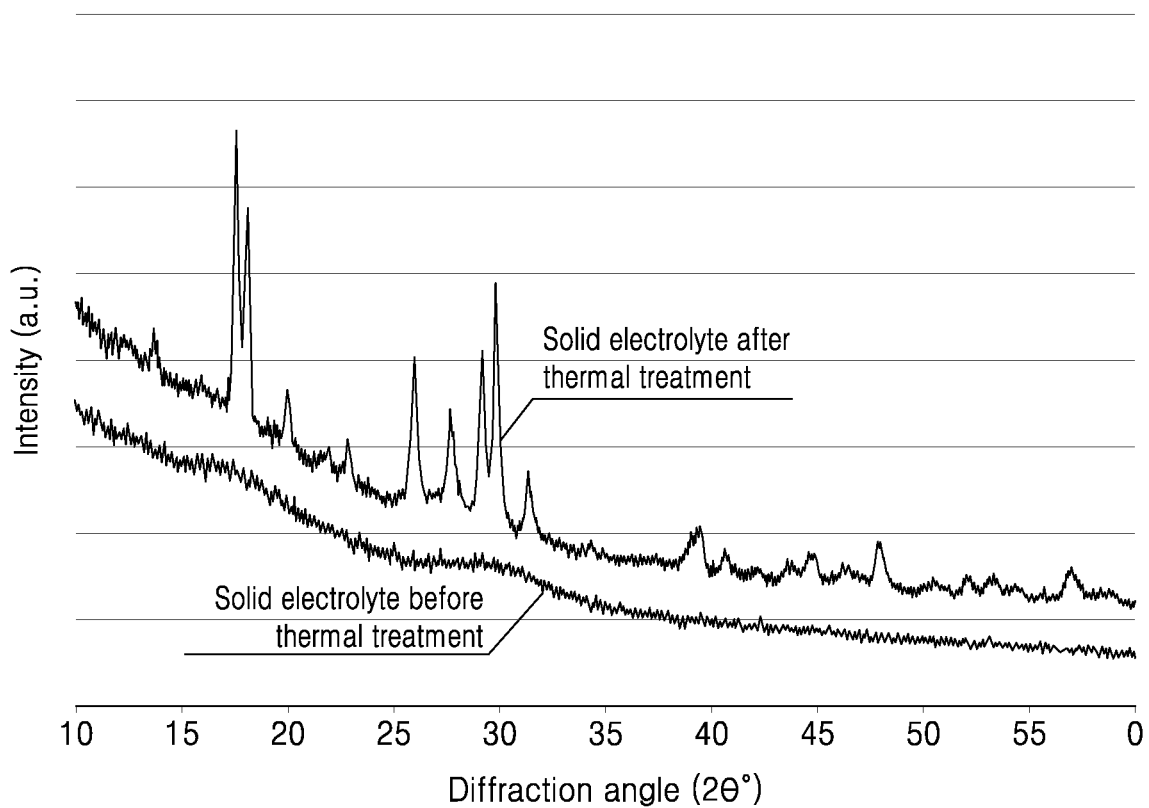
FIG. 5 is a graph of intensity versus diffraction angle (degrees two-theta, 2Θ°), showing X-ray diffraction spectra of a solid electrolyte material of Example 2 before and after the thermal treatment.

FIG. 5 is an X-ray diffraction graph of the solid electrolyte material of Example 2 before and after the thermal treatment. Referring to FIG. 5, the solid electrolyte material of Example 2 before the thermal treatment was found to exhibit no significant peak, indicating being present in amorphous form. However, the solid electrolyte material after the thermal treatment was found to exhibit several peaks, indicating formation of a high-temperature phase through crystallization.

Figure 6:
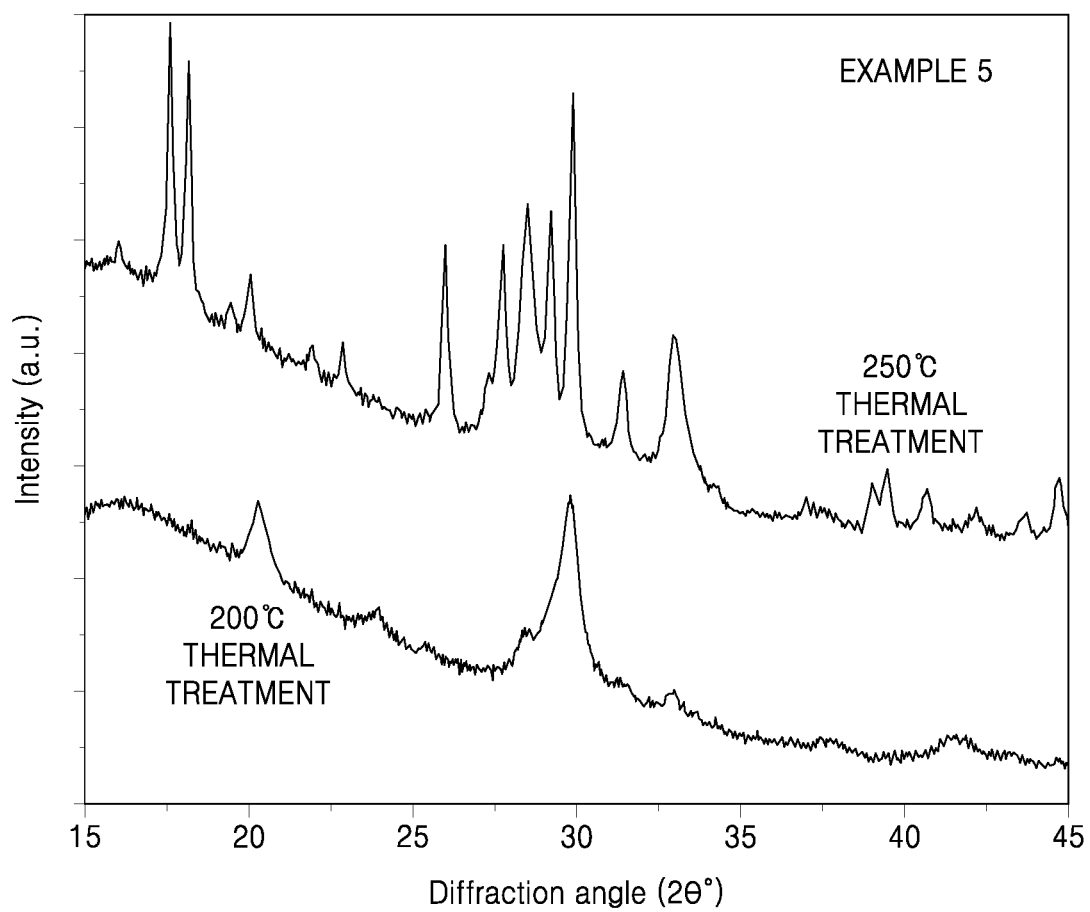
FIG. 6 is a graph of intensity versus diffraction angle (2Θ°) showing X-ray diffraction spectra of a phase-transition solid electrolyte material of Example 5.

FIG. 6 is an X-ray diffraction graph of the solid electrolyte material of Example 5 thermally treated at different temperatures. Referring to FIG. 6, it was found that the crystalline phase was clearly changed by thermal treatment at 250° C.

3. Manufacture of all-Solid Secondary Battery (Test Cell)

Example 9

(i) Formation of Cathode Layer $LiNi_{0.8}Co_{0.15}Al_{0.52}$ (NCA) was prepared as a cathode active material. The solid electrolyte material of Example 4 was prepared as a solid electrolyte. Carbon nanofibers (CNF) were prepared as a conducting agent. Subsequently, the cathode active material, the solid electrolyte material, and the conducting agent were mixed in a ratio of 60:35:5 by mass in order to form a cathode layer.

(ii) Formation of Anode Layer

A lithium (Li) foil having a thickness of about 30 μm was prepared as an anode current collector, and used as an anode layer.

(iii) Formation of Solid Electrolyte Layer 150 mg of the solid electrolyte material of Example 4 was solidified by applying pressure, to thereby form a solid electrolyte layer.

(iv) Manufacture of all-Solid Secondary Battery

The cathode layer, the solid electrolyte layer, and the anode layer were stacked in the stated order and then pressure-molded by applying a pressure of about 4 tonnes per square centimeter (ton/cm$^2$), to thereby manufacture an all-solid secondary battery (test cell) of Example 9.

Reference Example

An all-solid secondary battery (test cell) as a reference example was manufactured in the same manner as in Example 9, except that LiI—Li$_3$PS$_4$ was used in the cathode layer and the solid electrolyte layer, instead of the solid electrolyte material of Example 4.

4) Battery Characteristic Evaluation

Battery characteristics of the all-solid secondary battery of Example 9 and the all-solid secondary battery of the reference example were evaluated as follows.

Initial Discharge Capacity and Rate Retention

The first-discharge capacities and rate characteristics of the all-solid secondary battery of Example 9 and the all-solid secondary battery of the reference example were evaluated. The cut-off potential was about 4.25V-2.5V (with respect to Li/Li+), and a constant current of 0.1 C was applied (constant current-constant voltage (CCCV) mode). During discharge, a constant current (CC) of 0.2 C, 0.33 C, and 1 C were applied. The obtained first-discharge capacities and the capacity rate retention (ratio of first-discharge capacity at 1 C to first-discharge capacity at 0.33 C) are shown in Table 2. A C rate means a current which will discharge a battery in one hour, e.g., a C rate for a battery having a discharge capacity of 1 ampere-hour would be 1 ampere.

Cycle Characteristics

The first-discharge capacity and cycle capacity retentions of the all-solid secondary battery of Example 9 and the all-solid secondary battery of the reference example were evaluated. The cut-off potential was about 4.25V-2.5V (with respect to Li/Li+), and a constant current of 0.1 C was applied (CCCV mode). During discharge, a constant current (CC) of 0.5 C was applied. The cycle retention was evaluated as a ratio of 50$^{th}$-cycle discharge capacity to first-discharge capacity. The cycle retentions are shown in Table 2.

TABLE 2

| | Initial discharge capacity (mAh/g) | | | Rate retention (%) | Cycle retention |
| --- | --- | --- | --- | --- | --- |
| | 0.2 C | 0.33 C | 1 C | (1 C/0.33 C) | (%) |
| Example 9 | 185 | 176 | 158 | 89.8 | 75.8 |
| Reference Example | 172 | 158 | 135 | 85.7 | 68.5 |

As shown in Table 2, the all-solid secondary battery of Example 9 was found to have a higher initial (first) discharge capacity at any rate and a higher rate retention, as compared with the all-solid secondary battery of the reference example. The all-solid secondary battery of Example 9 was found to have a higher cycle retention, as compared with the all-solid secondary battery of the reference example.

As described above, when the solid electrolyte material represented by Formula (4) or Formula (5) is used, an all-solid secondary battery may have a shutdown function, and may have improved battery characteristics, as compared with when a solid electrolyte material including an iodide is used.

It should be understood that embodiments described herein should be considered in a descriptive sense only and not for purposes of limitation. Descriptions of features or aspects within each embodiment should typically be considered as available for other similar features or aspects in other embodiments.

While an embodiment have been described with reference to the figures, it will be understood by those of ordinary skill in the art that various changes in form and details may be made therein without departing from the spirit and scope as defined by the following claims.

What is claimed is:

1. A phase-transition solid electrolyte material comprising: a sulfide material represented by Formula (4)

$$d(e\text{LiBr-}(1-e)\text{LiCl})\text{-}(1-d)\text{Li}_3\text{PS}_4 \qquad (4)$$

wherein, in Formula (4)
0.1≤d≤0.7, and
0≤e≤1;
the phase-transition solid electrolyte material further comprising at least one sulfide material represented by Formula (1), wherein the at least one sulfide material represented by Formula (1) is distinct from the sulfide material represented by Formula (4):

$$b\text{LiX-}(1-b)(c\text{Li}_2\text{S-}(1-c)\text{P}_2\text{S}_5) \qquad (1)$$

wherein, in Formula (1),
0.1≤b≤0.7,
0.6≤c≤0.9,
and X is at least one of Cl, Br, or I.

2. The phase-transition solid electrolyte material of claim 1, wherein,
in Formula (1),
0.2≤b≤0.67, and
0.7≤c≤0.8.

* * * * *